July 21, 1931.     W. H. MOSS     1,815,444
METHOD OF UNITING ARTICLES AND PRODUCT THEREOF
Filed April 2, 1929
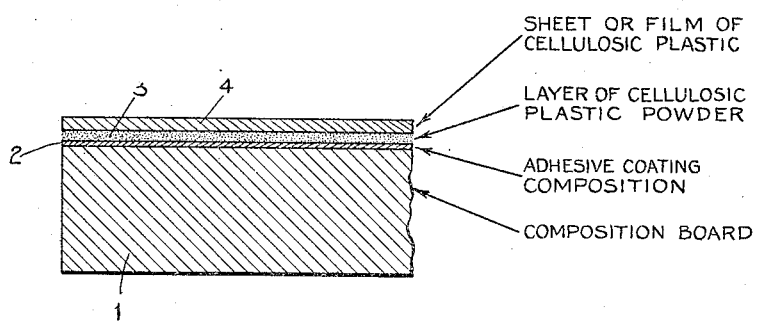
INVENTOR
William Henry Moss
BY
J. Seltzer and B. W. Levinson
ATTORNEYS Patented July 21, 1931

1,815,444

UNITED STATES PATENT OFFICE

WILLIAM HENRY MOSS, OF CUMBERLAND, MARYLAND, ASSIGNOR TO CELANESE CORPORATION OF AMERICA, A CORPORATION OF DELAWARE

METHOD OF UNITING ARTICLES AND PRODUCT THEREOF

Application filed April 2, 1929. Serial No. 352,059.

This invention relates to the method of uniting articles by adhesive compositions containing a derivative of cellulose, and relates more particularly to the use of a liquid coating composition containing a derivative of cellulose in conjunction with a powder containing such derivative of cellulose as adhesives.

An object of my invention is to unite articles by means of compositions containing derivatives of cellulose. Other objects of my invention will appear from the following detailed description.

The adhesives ordinarily employed are not wholly satisfactory for use in causing surfaces to adhere in those cases where one or both of the surfaces is smooth, and especially in case where a plastic sheet or film is to be caused to adhere to another surface. I have found that very good joints may be formed between surfaces to be united by applying to one or both of such surfaces a solution containing a derivative of cellulose and a resin compatible therewith in a volatile solvent, permitting the volatile solvent to evaporate, then applying a powder containing finely divided derivative of cellulose and a plastifier, and then pressing at elevated temperatures. In order to avoid waviness of surface when a plastic film or sheet is one of the articles to be united, the volatile solvent in the adhesive coating composition is preferably expelled to a large extent prior to the application of the powder containing the finely divided derivative of cellulose, or at least prior to the joining of the articles by heat and pressure.

Reference is had to the accompanying drawing, wherein the figure shows diagrammatically one of the many specific modes of carrying out this invention.

In accordance with my invention, articles or sheets of various natures are united by the application to one or both surfaces to be joined of an adhesive coating composition containing a derivative of cellulose and a resin that is preferably compatible therewith dissolved in a suitable solvent or solvent mixture. This solution may also contain plastifiers, pigments or other effect materials. After the application of this solution, the volatile solvent is permitted to evaporate, and then a powder containing a finely divided derivative of cellulose and a plastifier is applied in any desired thickness to the film formed from the adhesive coating composition, the two surfaces to be united are then placed in juxtaposition, and then heat and pressure is applied, whereby a firm bond or union is formed.

The adhesive coating composition that is first applied to the surfaces may contain any suitable derivative of cellulose such as cellulose nitrate or organic derivatives of cellulose. Examples of organic derivatives of cellulose are organic esters of cellulose and cellulose ethers. Examples of organic esters of cellulose are cellulose acetate, cellulose formate, cellulose propionate and cellulose butyrate while examples of cellulose ethers are ethyl cellulose, methyl cellulose and benzyl cellulose.

The resin to be employed in the adhesive coating composition may preferably be any resin that is compatible with the derivative of cellulose to be employed. By compatible is meant that the resin and the derivative of cellulose should be soluble in a common solvent or mixture of solvents to form clear and homogeneous solutions, which solutions, upon evaporation of the solvent, form clear and homogeneous films from which neither the resin nor the derivative of cellulose is precipitated. Any of the natural resins may be employed, provided they are compatible in the mixture used. If desired, a semi-synthetic resin such as ester gum may be employed when cellulose nitrate is the derivative of cellulose. However, I prefer to use a synthetic resin that is compatible with the derivative of cellulose.

This synthetic resin may be obtained by resinifying organic compounds, such as phenols or cresols with aldehydes or ketones, preferably in the presence of an acid catalyst, and should be of the fusible and soluble type. It may be prepared by condensing a phenol or cresol with an aldehyde such as formaldehyde, paraformaldehyde or acetaldehyde in the presence of phosphoric acid or an acid phosphate as described in my prior application #217,536, filed September 3, 1927. The synthetic resin employed may be a soluble and fusible resin formed by the condensation of diphenylol propane and an aldehyde, such as formaldehyde, particularly as described in my application #227,869, filed October 21. 1927, or formed by the condensation of diphenylol propane and a ketone, such as acetone, as described in my copending application #227,870 filed October 21. 1927, or formed by the condensation of diphenylol propane-acetone with an aldehyde as described in application #227,871, filed October 21, 1927. Examples of other synthetic resins suitable for use in my invention are the lactic acid resins prepared by heating lactic acid under reflux, such as is described in my application No. 227,393, toluene sulfonamid-aldehyde resins, such as described in the application of Moss and White, No. 300,154, filed August 16, 1928, benzene sulfonamid-aldehyde resins, xylene sulfonamid-aldehyde resins, ethyl toluene sulfonamid-aldehyde resins, etc. Examples of other suitable resins are those formed by the condensation of phenol and furfural, furfural and aniline and furfural and acetone. However, I have found that in the preparation of the resins to be used in the adhesive, it is not absolutely necessary to purify these resins or free them from excess of reactants or from products of reactions.

If desired natural resins may be aded to the adhesive coating liquids, and these need not necessarily be absolutely compatible with the organic derivative of cellulose in the solution. It is therefore possible to replace the synthetic resins, in whole or in part, with natural resins or gums, such as shellac, dammar, sandarac, kauri, acaroides or rosin. Other resins such as cumarone resin or the resin formed by the condensation of phenol-formaldehyde resins with rosin may also be employed.

The amount of solid film forming material employed in the adhesive solution may be varied considerably. Thus solutions having as little as 1% of film forming material may be used for some purposes, while for others, I may prefer to use solutions containing 60 or 70% of film forming materials. Other solutions may contain amounts of this material varying from 1% to 70% of the solution.

The solvent employed in making the adhesive coating composition may contain any suitable low boiling solvent. Examples of such solvents are acetone, chloroform, ethyl alcohol, methyl alcohol, ethyl acetate, methylene chloride, ethylene dichloride, benzene, or any suitable mixture of these. If desired, medium and/or high boiling solvents such as ethyl lactate, diacetone alcohol, benzyl alcohol, etc., may be added to the solution. The adhesive may also contain other resins, natural or synthetic, and suitable plastifiers or softening agents such as camphor, triacetin, diethyl phthalate, dibutyl tartrate, diphenylol propane, etc. The derivative of cellulose employed may preferably be of low viscosity characteristics.

After the application of the liquid coating composition to either or both surfaces of the articles to be united, the volatile solvent in the adhesive coating composition is permitted to evaporate, and when the coating is tacky, a thin layer of a powder containing finely divided derivative of cellulose and plastifier is applied thereto in desired, but preferably small, amounts. This powder may contain any of the derivatives of cellulose above described, any suitable plastifier, such as those above described, and if desired may also contain any of the synthetic resins, as above described. This powder contains the ingredients in intimate and finely divided admixture.

The articles that may be caused to adhere by the use of this adhesive may be of any desired shape or form, and may be of any desired pattern. Thus, the articles to be joined may be in the form of sheets, plates, slabs, blocks, rods, bricks or any of the complicated shapes of finished articles of any size. The articles to be joined may be of plastic material containing derivatives of cellulose, glass, metal, paper, cardboard, wood, asbestos, composition board, stone, brick, ceramic material, leather, fabrics of all kinds, etc. The two surfaces that are to be caused to adhere may be of the same kind, e. g. glass to glass, or of different kind, e. g. cellulose derivative plastic to asbestos board. However, as previously stated, the greatest advantages accrue when at least one of the surfaces to be joined is smooth, such as the surface of plastic sheets containing derivatives of cellulose, glass or metal. By my adhesive, glass may be caused to adhere to bricks or walls.

The applications of this invention are so numerous that only a few will be given here. An important use of the adhesive is in causing plastic sheets containing derivatives of cellulose to adhere to plaster, asbestos board, or composition board, or other material used in the construction of walls or ceilings of buildings. Plastic sheets containing any of the derivatives of cellulose mentioned above, such as cellulose acetate or cellulose nitrate and a suitable plastifier may be employed to produce beautiful effects in interior decoration. However, heretofore no suitable adhesives have been known for causing such sheets to adhere to the surfaces to be decorated. I have found that my process is eminently suited for this purpose. A plastic sheet or film containing the derivative of cellulose, either clear, or colored with dye and/or pigment and, having, if desired, filling or other effect material to impart any desired variegated, mottled, pearl, grained, tortoise-like, marble, onyx, or other effect, is applied to plaster, asbestos, composition or other board to be used on walls or ceilings. In order to further prevent peeling of the films, I may incorporate any of the compatible resins above described in appropriate small amounts in the plastic sheet or film containing the derivative of cellulose in order to impart hardness to the film or sheet so that it will not tend to peel. The presence of the resins in the sheets or films also increases the adhesive power of the adhesive.

Another application of my invention is in causing a plastic sheet containing a derivative of cellulose to adhere to a metallic surface for decorative purposes.

In applying the adhesive coating composition, the same may be applied by brushing, spraying or flowing the same only onto one surface or onto both surfaces to be united. If it is applied to only one surface, it is usually applied to the more receptive or more porous surface.

As an example of one mode of applying my invention, the application of a plastic sheet containing cellulose acetate to a composition board will be described, reference being had to the accompanying drawing. The adhesive coating composition 2 is applied liberally to the surface of the composition board 1, and the volatile solvent then allowed to evaporate until a tacky coat is formed. Thereupon a powder 3 containing finely divided and intimately mixed organic derivative of cellulose and plastifier is sprinkled on this tacky coat to form a thin layer, and a further drying of the tacky layer is permitted. A plastic sheet or film 4 containing cellulose acetate is then placed upon the surface of the adhesive coated composition board, and the same pressed at elevated temperatures for a suitable time. As an example of conditions that I have found satisfactory, it may be stated that a pressure of 800 lbs. per square inch, a temperature corresponding to a steam pressure of 10 lbs. per square inch and a time of pressing of 15 minutes have been found satisfactory. However, more or less pressures and temperatures may be employed, and in some cases ordinary hand pressure and ordinary temperature produce useful results.

When plastic sheets or films containing derivatives of cellulose are to be caused to adhere to surfaces, it is preferable to employ the same derivative of cellulose in making the adhesive as occurs in the plastic sheet or film. Thus if a sheet containing cellulose acetate is to be caused to adhere, both the adhesive coating composition and the powder preferably contain cellulose acetate, while if the sheet contains cellulose nitrate, the adhesive coating composition and the powder should contain cellulose nitrate. Also if the plastic sheet contains resins, the same resins are preferably employed in either the liquid adhesive composition or the powder or both.

In order further to illustrate my invention, the following specific examples are given of a liquid adhesive coating composition and of a powder containing finely divided derivative of cellulose that may be employed.

*Example I*

As an example of a suitable liquid adhesive coating composition that may be used in the first step of my process, the following is given:

| | Parts by weight |
|---|---|
| Cellulose acetate | 1 to 9 |
| A compatible synthetic resin | 9 to 1 |
| Diethyl phthalate | 2 to 10 |
| Acetone | 50 |
| Benzene | 25 |
| Alcohol | 25 |
| Ethyl lactate | 10 |

The compatible synthetic resin for this example may be a phenol formaldehyde resin, a diphenylol propane-formaldehyde resin, a diphenylol propane-acetone resin, a diphenylol propane-acetone-formaldehyde resin, a furfural aniline resin, a phenol furfural resin or the resin prepared by heating lactic acid.

*Example II*

The following is an example of a method of making a powder containing finely divided cellulose acetate and plastifier to be applied to the film formed after the evaporation of the volatile solvent of the liquid adhesive composition described in Example I.

80 lbs. of cellulose acetate of an average fineness of 6 to 8 mesh are placed in a pebble mill with about 800 lbs. of 1½ to 2″ flint stones and ground for 6 to 8 hours, more or less. At the end of such grinding it will be found that about 80% of the cellulose acetate passes through an 80 mesh sieve. To this ground mass of cellulose acetate in the mill are added 24 lbs. of triacetin and 4 lbs. of diethyl phthalate, and the mill is then run for a further period of 8 hours. After this final grinding and mixing, the mass is in the form of a homogeneous and finely divided powder, and may be used for applying to the film formed from the adhesive coating composition.

It is to be understood that the foregoing detailed description is given merely by way of illustration and that many variations may be made therein without departing from the spirit of my invention.

Having described my invention, what I claim and desire to secure by Letters Patent is:

1. Method of uniting surfaces comprising applying a liquid adhesive coating composition containing a derivative of cellulose and a resin compatible therewith on at least one of the surfaces, then applying a powder containing a finely divided derivative of cellulose and then pressing the surfaces at suitable temperatures.

2. Method of uniting surfaces comprising applying a liquid adhesive coating composition containing cellulose acetate and a resin compatible therewith on at least one of the surfaces, then applying a powder containing finely divided cellulose acetate and then pressing the surfaces at suitable temperatures.

3. Method of causing a sheet or film of plastic material containing a derivative of cellulose to adhere to a surface comprising applying to the surface an adhesive liquid composition containing a derivative of cellulose and a resin compatible therewith, then applying a powder containing a finely divided derivative of cellulose and a plastifier, and then pressing at suitable temperatures.

4. Method of causing a sheet or film of plastic material containing cellulose acetate to adhere to a surface comprising applying to the surface an adhesive liquid composition containing cellulose acetate and a resin compatible therewith, then applying a powder containing finely divided cellulose acetate and a plastifier, and then pressing at suitable temperatures.

5. Articles of manufacture or surfaces like walls having therein a layer formed from an adhesive liquid coating composition containing a derivative of cellulose and a resin and a powder containing a finely divided derivative of cellulose between and uniting the component parts.

6. Articles of manufacture or surfaces like walls having therein a layer formed from an adhesive liquid coating composition containing cellulose acetate and a resin and a powder containing finely divided cellulose acetate between and uniting the component parts.

7. An article having a plastic sheet or film containing a derivative of cellulose which is united to the surface of a component of the article by an intermediate layer formed from a liquid adhesive containing a derivative of cellulose and a synthetic resin compatible therewith and a powder containing a finely divided derivative of cellulose.

8. An article having a plastic sheet or film containing cellulose acetate which is united to the surface of a component of the article by an intermediate layer formed from a liquid adhesive containing cellulose acetate and a synthetic resin compatible therewith and a powder containing finely divided cellulose acetate.

In testimony whereof, I have hereunto subscribed my name.

WILLIAM HENRY MOSS.